July 9, 1968

E. LASITER 3,391,778

VEHICLE UNLOADER

Filed Oct. 31, 1966

INVENTOR.
ELVIE LASITER
BY
ATTORNEYS

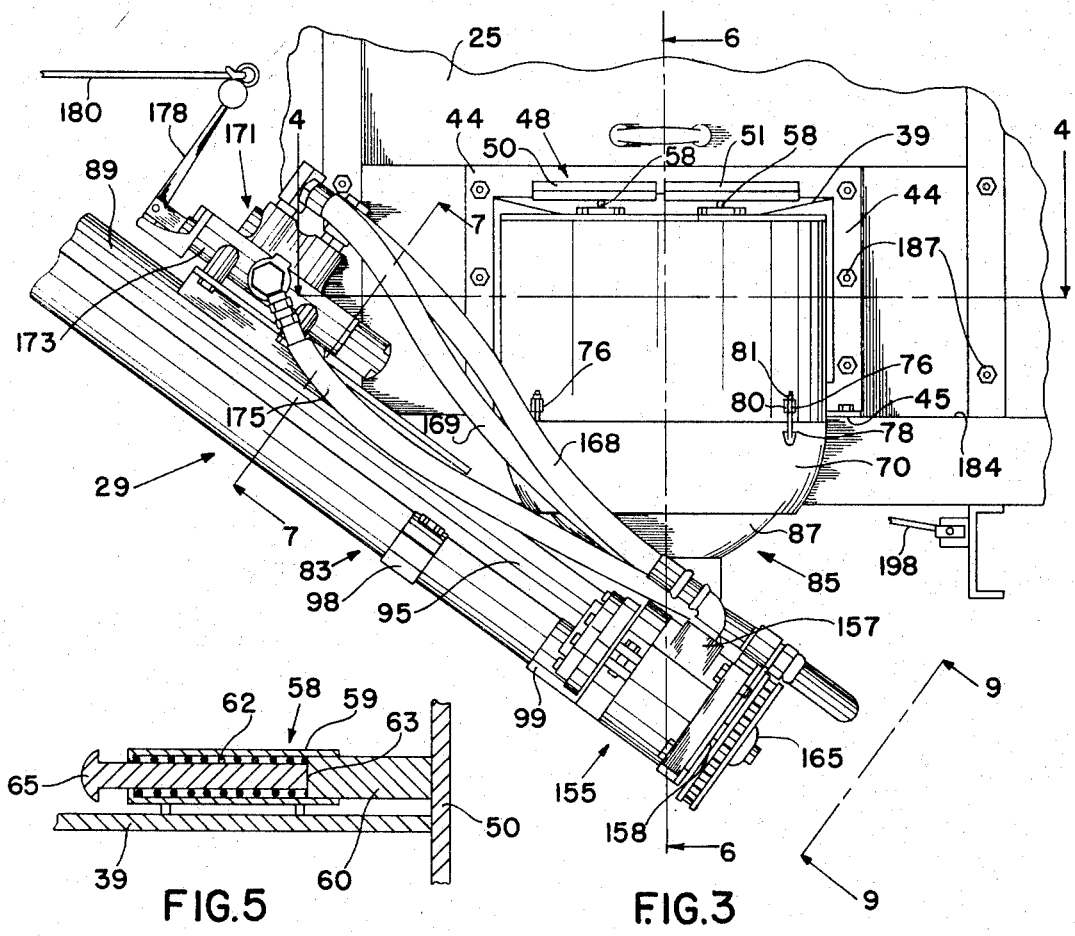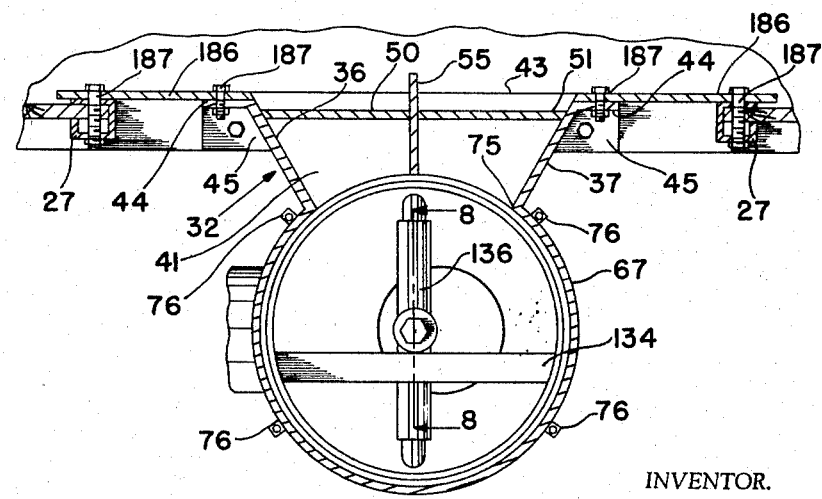

July 9, 1968

E. LASITER 3,391,778

VEHICLE UNLOADER

Filed Oct. 31, 1966

INVENTOR.
ELVIE LASITER
BY John H. Widdowson
Phillip A. Bein
ATTORNEYS

July 9, 1968 E. LASITER 3,391,778
VEHICLE UNLOADER
Filed Oct. 31, 1966 4 Sheets-Sheet 4

INVENTOR.
ELVIE LASITER
BY
John H. Widdowson
Phillip A. Rein
ATTORNEYS

United States Patent Office 3,391,778
Patented July 9, 1968

3,391,778
VEHICLE UNLOADER
Elvie Lasiter, Caldwell, Kans. 67022
Continuation-in-part of application Ser. No. 439,789,
Mar. 15, 1965. This application Oct. 31, 1966, Ser.
No. 590,894
5 Claims. (Cl. 198—64)

ABSTRACT OF THE DISCLOSURE

An unloader apparatus attachable to a truck bed to convey material therefrom having a ball and socket means; an elongated auger means connected to the ball and socket means rotatable to numerous horizontal and vertical positions; means biasing the ball and socket means into resilient contact for sealing purposes; hydraulic motor means operable to rotate the auger means in either direction for conveyance and clean-out purposes; and the auger means having a clean-out gate to flush material therefrom as required.

---

This invention relates to an unloader apparatus operable in conjunction with vehicles and, more particularly, to an adjustable unloader apparatus operable to convey grain and the like to a desired location. More specifically, this invention relates to an adjustable unloader apparatus attachable to a truck bed to convey material such as fertilizer, grain and the like to a given radial distance, direction, and the height position therefrom. This application is a continuation-in-part of applicant's copending application Ser. No. 43,789, filed Mar. 15, 1965 now Patent No. 3,342,355.

Various types of unloader structures are known to the prior art adapted for transferring material such as grain and the like from a truck bed to a desired location. The prior art devices are structurally complicated and limited in freedom of movement so as to hinder the position of discharge of material therefrom. Additionally, these devices are difficult to clean and maintain, expensive to manufacture, hard to manipulate, and require considerable operating power.

In accordance with the present invention, a new unloader apparatus preferably mountable on a conventional truck bed is provided that includes a conveyor means connected to a gathering box means which, in turn, is secured to the truck bed. The gathering box means includes an inlet channel which is selectively opened and closed by a gate means. The inlet channel leads to an inner chamber having a cylindrical housing with a downwardly depending spherical socket member releasably connected thereto. The conveyor means has an elongated spout means releasably connected to a ball connector assembly that is pivotally mounted within the socket member thereby providing for arcuate movement of the spout means about the gathering box means. Within the gathering box means is a biasing means secured to the cylindrical housing and connected to the ball connector assembly to maintain contact pressure between the socket member and the ball connector assembly to aid in holding the spout means in a given selected position. The spout means includes an elongated auger member rotatably mounted within a tubular casing having a discharge nozzle member secured to the outer end thereof. A motor means is secured to the ball connector assembly and connected to the auger means for rotation thereof to convey material laterally of the gathering box means for discharge through the nozzle member to a desired location.

Accordingly, it is an object of this invention to provide a new and novel unloader apparatus overcoming the above-mentioned disadvantages of the prior art devices.

Another object of this invention is to provide an unloader apparatus readily movable so as to discharge material therefrom in a plurality of desired locations.

A further object of this invention is to provide an unloader apparatus having a gathering box means to receive material from a truck bed and a spout means rotatably connected thereto operable to discharge material at a selected radial distance, direction, and height from the gathering box means.

Still, another object of this invention is to provide an unloader apparatus having an elongated spout means mounted by ball and socket means to a gathering box means so as to permit the arcuate movement of the spout means in any given direction.

One other object of this invention is to provide an unloader apparatus that is readily mountable on a conventional truck bed and powered by hydraulic motor readily available on the aforementioned truck.

Still, a further object of this invention is to provide an unloader apparatus having a gathering box means, a gate means secured to the gathering box means operable to selectively control discharge of different materials from a truck bed, a ball and socket means pivotally connected to the gathering box means, and an elongated spout means connected to the ball and socket means operable to convey material from the gathering box means laterally therefrom.

Another one of the objects of this invention is to provide an unloader apparatus that is simple to operate, economical to manufacture, easy to repair and maintain, and readily adaptable for a multitude of material unloading uses.

Various other objects, advantages, and features of the invention will become apparent to those skilled in the art from the following discussion, taken in conjunction with the accompanying drawings, in which:

FIG. 3 is a fragmentary elevational view of the unloader apparatus of this invention shown as mounted on the truck bed;

FIG. 4 is a fragmentary sectional view taken along line 4—4 in FIG. 3;

FIG. 5 is an enlarged fragmentary elevational view of one latch means of the unloader apparatus of this invention adapted to hold a sliding gate in a given position;

Figure 1:
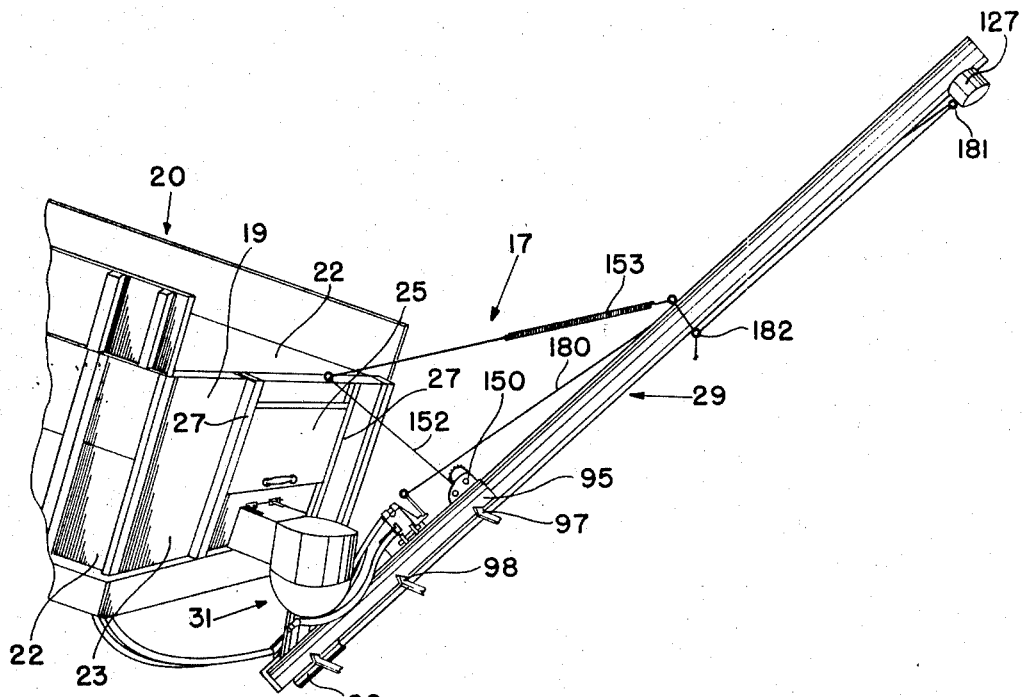
FIG. 1 is a fragmentary perspective view of a truck bed having a preferred specific embodiment of the unloader apparatus of this invention mounted thereon.

The following is a discussion and description of preferred specific embodiments of the new unloader apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail, and in particular to FIG. 1, the unloader apparatus of this invention indicated generally at 17, is illustrated as connected to a tail or end gate 19 of a truck bed 20. The truck bed 20 has upright sidewalls 22 and an end wall 23 operable to contain and convey fertilizer, grain, and the like therein. The tail gate 19 has a discharge door 25 slidably mounted between upright support posts 27 whereby the door 25 is raised and lowered to control material flow from the truck bed 20. The unloader apparatus 17 has a conveyor means 29 connected to a gathering box means 31 which, in turn, is attachable to the truck bed 20.

Figure 2:
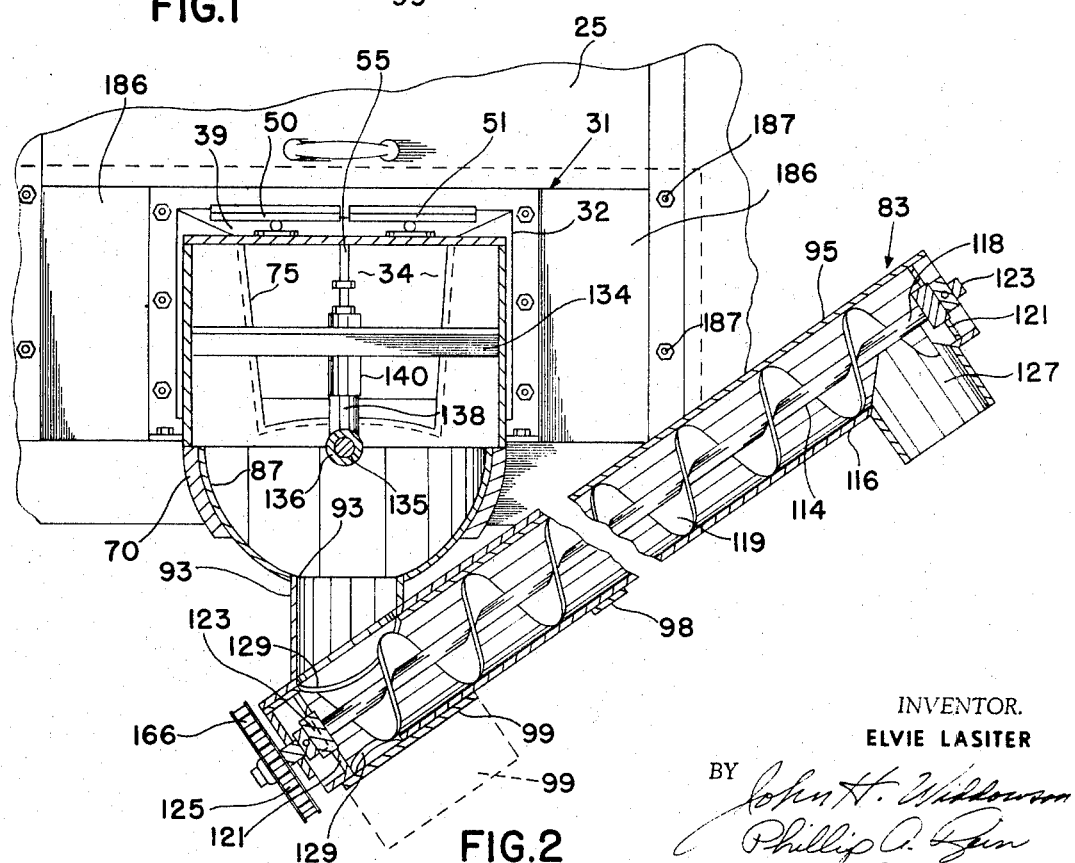
FIG. 2 is an enlarged fragmentary sectional view of the unloader apparatus of this invention illustrated herein as mounted on a truck bed.

More specifically, as shown in FIGS. 2 and 4, the gathering box means 31 includes a somewhat funnel-shaped directing means 32 secured to a receiving chamber or reservoir 34. The directing means 32 has a pair of outwardly diverging sidewalls 36 and 37 interconnected by top and bottom walls 39 and 41, respectively, thereby defining an enlarged entrance opening 43. A flange 44 extends laterally of the walls 36, 37, 39 and 41 with an additional support ledge 45 extended rearwardly of the bottom wall flange 44 for reasons to be explained. The top and bottom walls 39 and 41 are parallel and extended perpendicular to the flanges 44. Further, the directing means 32 has a gate means 48 connected thereto to control material flow therethrough.

Figure 6:
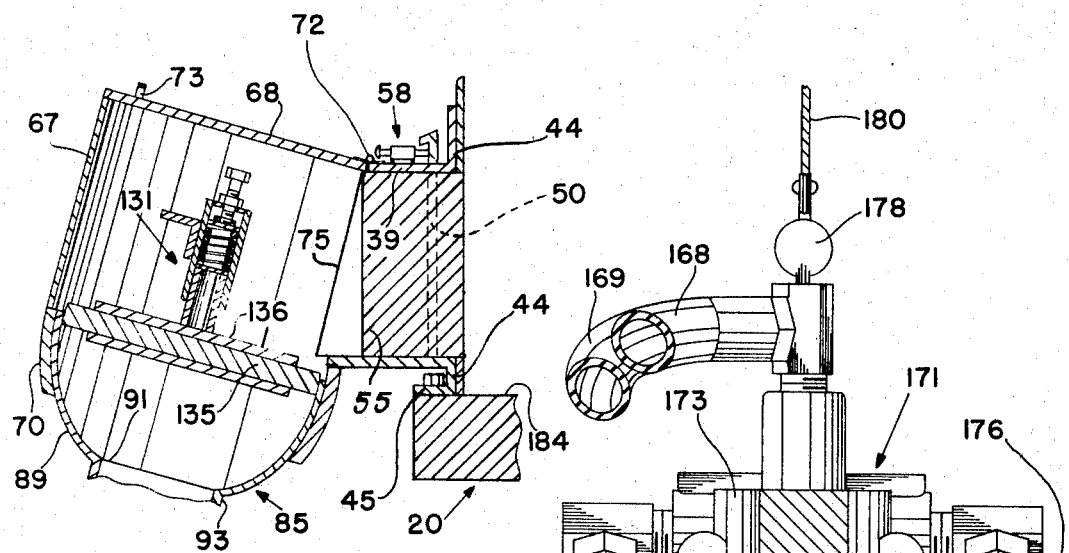
FIG. 6 is a fragmentary sectional view taken along line 6—6 in FIG. 3 having the truck bed in the normal horizontal position.

The gate means 48 includes a pair of upright gate members 50 and 51 extended through respective openings 53 in the top wall 39 and resting in the closed position on the bottom wall 41 (FIG. 6). An upright plate 55 secured to the top and bottom walls 39 and 41 between the gate members 50 and 51 separate the incoming opening 43 into separate material flow portions. The gate members 50 and 51 are constructed of rectangular plates having the top edges thereof reversely bent to form lift sections 57. Intermediate the lift sections 57 and the top wall 39 are latch members 58 secured as by welding to the top wall 39. As shown in FIG. 5, each latch member 58 has an outer tubular casing 59 enclosing an axially movable bolt member 60. A compression spring 62 mounted within the casing 59 acts against one end thereof and a shoulder 63 on the bolt member 60 to bias the outer end of the same into engagement with the respective gate member 50 or 51. The other end of the bolt member 60 is formed with a head or a knob 65 that is readily grasped and moved rearwardly to move the bolt member 60 out of contact with the respective gate member 50 or 51 thereby permitting the raising and lowering of same. It is obvious that the gate members 50 and 51 can be selectively raised and lowered to control material flow therethrough into the receiving chamber and are used to singularly discharge different types of material carried in the one truck bed 20.

The receiving chamber 34 has a main cylindrical body 67 having an upper open end covered by a closure plate 68 and a lower open end partially enclosed by a socket member 70. As shown in FIG. 6, the closure plate 68 is pivotally connected as by a hinge 72 to the top plate 39 and has an upright handle 73 for opening the same as required for cleaning and maintenance. The cylindrical body 67 has a cut-out portion 75 between the upper and lower ends thereof in substantial alignment with the discharge opening of the gathering box means 31 and is secured as by welding to the adjacent walls 36, 37, 39 and 41. The upright side edges of the cut-out portion 75 are inclined downwardly convergingly to aid in directing material towards the socket member 70. It is seen that the receiving chamber 34 is secured so to be upwardly inclined in an approximate 15 degree angle relative to the directing means 32 for reasons to be explained.

The socket member 70 is made of a heavy sheet material and formed into a shape resembling a cordal section of a sphere defined by the portion between two parallel planes extended transversely of the sphere. The upper large diameter edge of the socket member 70 abuts the cylindrical body 67 and is releasably connected thereto by clamp members 76. As shown in FIG. 3, each clamp member 76 consists of a bolt member 78 welded to the upper outer surface of the socket member 70 and extended through an opening in an angle bracket 80 secured to the adjacent outer surface of the cylindrical body 67. Nuts 81 threaded on the bolt members 78 secures the socket member 70 rigidly in place. Attached to a lower portion of the gathering box means 31 is the conveyor means 29 having an elongated spout means 83 releasably connected to a connector or attachment assembly 85.

The connector assembly 85 includes a ball member 87 mounted in nesting engagement with the socket member 70 having a laterally extended support cradle 89 secured thereto. The ball member 87 is of a spherical shape similar to the socket member 70 having a lower opening 91 with a tubular member 93 welded about the peripheral edge thereof. The opening 91 is radially offset relative to the vertical diametrical axis of the ball member 87 for reasons to become obvious. The lower end of the tubular member 93 is secured as by welding to one end of an elongated channel member 95 of the support cradle 89 inclined upwardly of the ball member 87 and in a direction furthest away from the opening 91 (FIG. 4). The channel member 95 opens downwardly and has three spaced retainer clamps 97, 98 and 99 to releasably secure the spout means 83 thereto.

Figure 7:
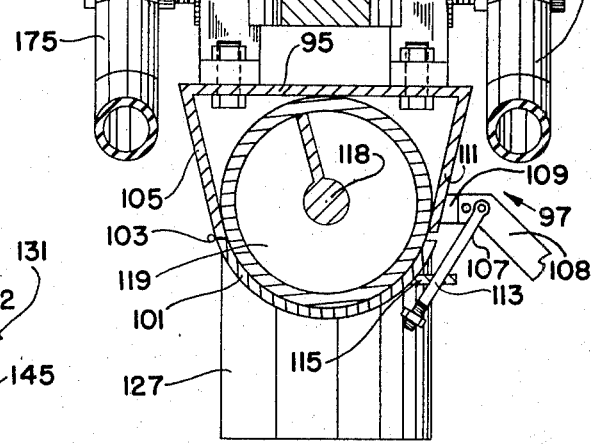
FIG. 7 is an enlarged fragmentary sectional view taken along line 7—7 in FIG. 3.

More specifically, the retainer clamps 97 and 98 are substantially identical except the clamp 99 is larger to serve as a material cleanout door; however, detailed discussion of the retainer clamp 97 is all that is deemed necessary. As shown in FIG. 7, the clamp 97 includes an arcuate band 101 having one end pivotally connected as by a hinge 103 to one leg 105 of the channel member 95. An actuator lever 107 connected to the other end of the band 101 has a handle 108 pivotally connected to a stud 109 secured to the other converging leg 111. An actuator rod 113 is pivotally connected to the handle 108 and extends through an opening in a lug 115 welded to the band 101. It is seen, therefore, on upward movement of the handle 108 from the position of FIG. 7, the rod 113 and integral band 101 is raised to hold and lock the spout means 83 therebetween as will be explained. The retainer clamp 99 is substantially identical except its arcuate bank 101 is considerably wider for reasons to become obvious.

As shown in FIG. 2, the spout means 83 has an elongated auger screw 114 rotatably mounted within an outer casing or housing 116. The auger screw 114 has a central shaft 118 and an integral vane or blade 119 extended to positions adjacent opposite ends thereof. The housing 116 is of a cylindrical shape having transverse plates 121 at opposite ends supporting the respective opposite ends of the shaft 118 within bearing members 123 for rotational movement. The lower end of the shaft 118 extends laterally of the respective plate 121 and has a sprocket member 125 secured thereto. The housing 116 is formed with a laterally extended discharge nozzle section 127 at the upper end and with a pair of opposed circular openings 129 adjacent the lower end adapted to be assembled in substantial alignment with the opening 91 and the tubular member 93 for reasons to become obvious. It is seen therefore, that the spout means 83 is releasably attachable to the connector assembly 85 and movable in any given arcuate pattern about the connected socket member 70 and the ball member 87.

Figure 8:
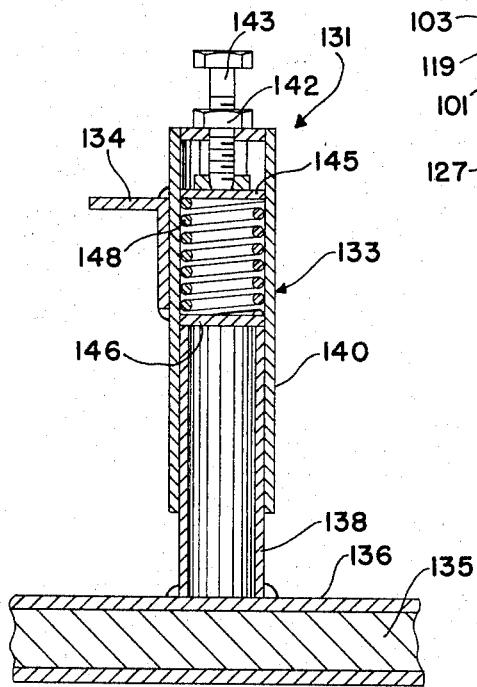
FIG. 8 is an enlarged fragmentary sectional view taken along line 8—8 in FIG. 4.

In order to assist in holding the spout means 83 in a given adjusted position, a tensioning means 131 is mounted within the cylindrical body 67 and includes an upright spring assembly 133 connected to an angle iron 134 welded to opposite inner sides of the cylindrical body 67 and to a shaft 135 secured to opposed upper edges of the ball member 87. As shown in FIGS. 6 and 8, the spring assembly 133 includes a sleeve 136 mounted about the shaft 134 for rotational movement having a tubular or pipe member 138 extended laterally therefrom. The pipe member 138 extends within a cap 140 which, in turn, is welded to the angle iron 134. The upper closed end of the cap 140 has a nut 142 welded thereto adapted to receive an adjusting bolt 143 therethrough having an aligning disc 145 secured to the lower end thereof within the cap 140. The upper open end of the pipe member 138 is closed with a cover number 146 and a compression spring 148 is mounted between the disc 145 and the cover member 146. It is seen that axial movement of the bolt 143 acts to adjust the tension of the spring 148 to force the ball member 87 into a loaded condition against the socket member 70. This frictional engagement of the spherical segments of the ball member 87 and the socket member 70 acts to aid in holding the spout means 83 in a given adjusted angular position relative to the gathering box means 31.

Additionally, in order to raise and lower the spout means 83 with a minimum of effort, a winch 150 is secured to the outer upper surface of the channel member 95 having an interconnected cable 152 and spring 153 connected to the truck bed 20 and the upper end of the spout means 83, respectively, for operation as will be explained.

Figure 9:
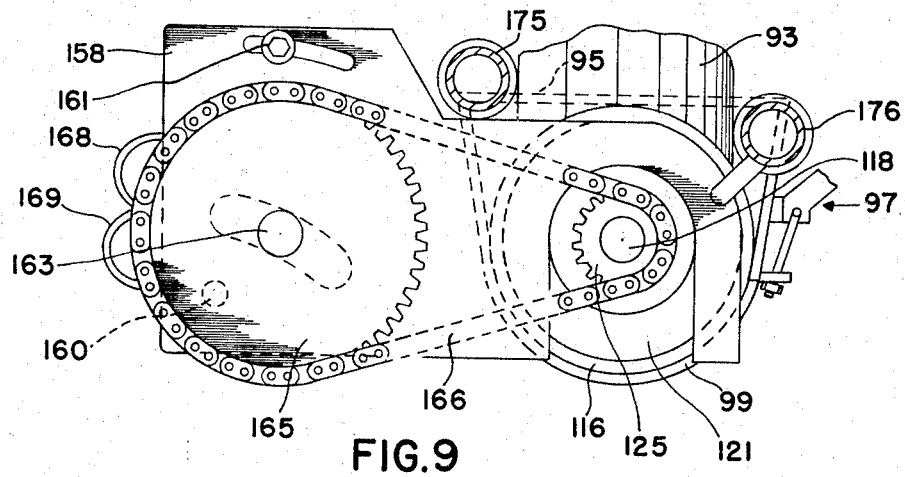
FIG. 9 is an enlarged fragmentary end view taken along line 9—9 in FIG. 3.

In order to provide motive power for the auger screw 114, the conveyor means 29 further includes a power means 155 having a motor 157 connected to a bracket plate 158 welded to the lowermost end of the channel member 95 (FIGS. 3 and 9). The motor 157 is preferably of a conventional hydraulic type such as a "CHAR-LYNN" (Trademark) Orbit Motor manufactured by the Char-Lynn Company of Minneapolis, Minn. and further discussion thereof is not deemed necessary. The motor 157 is pivotally connected to the bracket plate 158 by bolts 160 and 161 and pivotal about the bolt 160 similar to the movement of a conventional automotive generator for reasons to become obvious. The motor 157 has power shaft 163 connected to a drive sprocket 165 to power the auger screw 114 through a chain 166 connected to the sprockets 125 and 165 in a conventional manner. The motor 157 is supplied with operating fluid pressure through lines 168 and 169 which, in turn, are connected to a control valve 171.

As shown in FIG. 3, the control valve 171 is a conventional three-positional type having a housing 173 enclosing an axially movable piston (not shown) operable to control fluid flow through a supply line 175 and a return line 176 selectively to the lines 168 and 169, respectively. A control lever 178 pivotally connected to the housing 173 and the piston, respectively, is movable from the neutral position of FIG. 3 forwardly and rearwardly to rotatably drive the auger screw 114 through the motor 157 in either direction. The outer end of the control lever 178 is connected to one end of a cable 180 extended through a first pulley 181 secured to the nozzle section 127 and a second pulley 182 secured to a mid-portion of the housing 116. It is obvious that the other end of the cable 180 can be pulled to move the control lever 178 forwardly to actuate the motor 157 and energize the auger screw 114 through the control valve 171 to convey material upwardly for discharge through the nozzle section 127.

Figure 11:
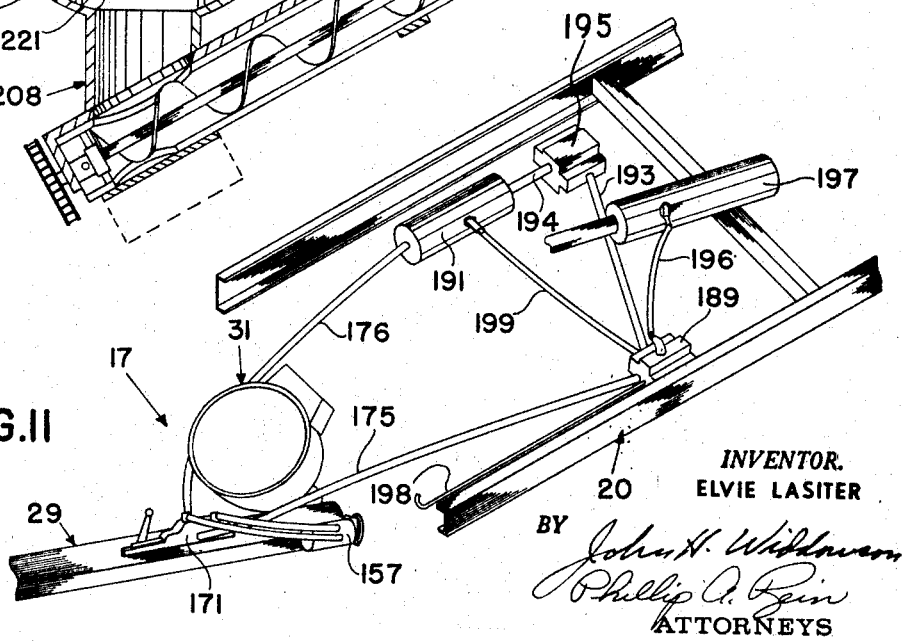
FIG. 11 is a schematic diagram of the power and hydraulic control means of the unloader apparatus of this invention.

In the use and operation of the unloader apparatus 17, the door 25 of the tail gate 19 is raised and the directing means 32 is mounted between the upright support posts 27 with the ledge 15 resting on a floor 184 of the truck bed 20 (FIG. 4). A pair of spacer plates 186 are secured as by bolts 187 to the flanges 44 and the adjacent support posts 27 to completely enclose the opening between floor 184, posts 27, and the door 25. As shown in FIG. 11, the supply and return fluid pressure lines 175 and 176 are connected to a selector valve 189 and a reservoir 191, respectively, and by lines 193 and 194 to a hydraulic pump 195 which is conventionally available in a dump-type truck bed 20. The selector valve 189 is also connected through line 196 to a lift cylinder 197 to raise and lower the truck bed 20 and is actuated by an elongated rod 198 to supply fluid under pressure to either the control valve 171, the lift cylinder 197, or to an excess flow line 199 to the reservoir 191.

The spout means 83, which can be carried within the truck bed 20 or mounted on the outside by brackets (not shown), is inserted within the clamp members 97, 98, and 99 with the lower ends of the shaft 118 and sprocket member 125 extended outwardly of the bracket plate 158. The housing 116 is rotated to place the openings 129 in alignment with the tubular member 93 and the handles 108 of the clamp members 97, 98, and 99 are actuated to secure the spout means 83 to the channel member 95. The motor 157 is pivotal about the bolt 160 so that the chain 166 is readily mountable on the sprockets 125 and 126 whereupon the motor 157 is pivoted and secured by the bolts 160 and 161 to place the required tension on the chain 166 for driving movement thereof. It is seen that the motor 157 is readily attachable to the spout means 83 by the chain 166 without the necessity of breaking the chain or special tools. The cable 152 from the winch 150 is trained through a pulley 203 on the truck bed 20 and the spring 153 is pivotally connected to a mid-portion of the spout means 83 whereby the vertical inclination of the spout means 83 is readily adjustable on winding of the cable 152 on or off the winch 150.

On unloading material from the truck bed 20, the lift cylinder 197 is actuated to incline the truck bed 20 as required to obtain gravity flow of the material towards the directing means 32 of the unloader apparatus 17. The gate members 50 and 51 are selectively opened depending on the amount and perhaps, if used in a separated truck bed to convey, for example, grain and fertilizer, the type of material that flows into the receiving chamber 34. Assuming the selector valve 189 has been energized by the rod 198 to supply pressure fluid to the control valve 171, the operator can actuate the motor 157 by moving the lever 178 forwardly on pulling the cable 180 whereby the auger screw 114 rotates counterclockwise, as viewed in FIG. 2, to move material upwardly within the housing 116 to discharge the same through the nozzle section 127. It is obvious that the spout means 83 and interconnected connector assembly 85 is movable through the contacting ball member 87 and the socket member 70 to place the nozzle section 127 in a desired radial, inclined, and height position from the gathering box means 31. The spring 153 permits consoiderable vertical movement of the spout means 83 under tension without requiring actuation of the winch 150 to achieve a smooth and uncomplicated movement thereof. It is seen that the offset opening 97 from the socket member 70 into the spout means 83 permits a large arc of vertical movement of the conveyor means 29 without interference with the tubular member 93.

After unloading the truck bed 20, the spout means 83 can be readily cleaned on opening of the large clamp member 99, as shown in dotted lines in FIG. 2, and rotating the auger screw 114 in the opposite direction on rearward movement of the actuator lever 178. The material therein is discharged through the lower one of the openings 129 for rapid cleaning thereby permitting the conveyance of feeds and fertilizers through the same unloader apparatus 17 without fear of harmful contamination.

Figure 10:
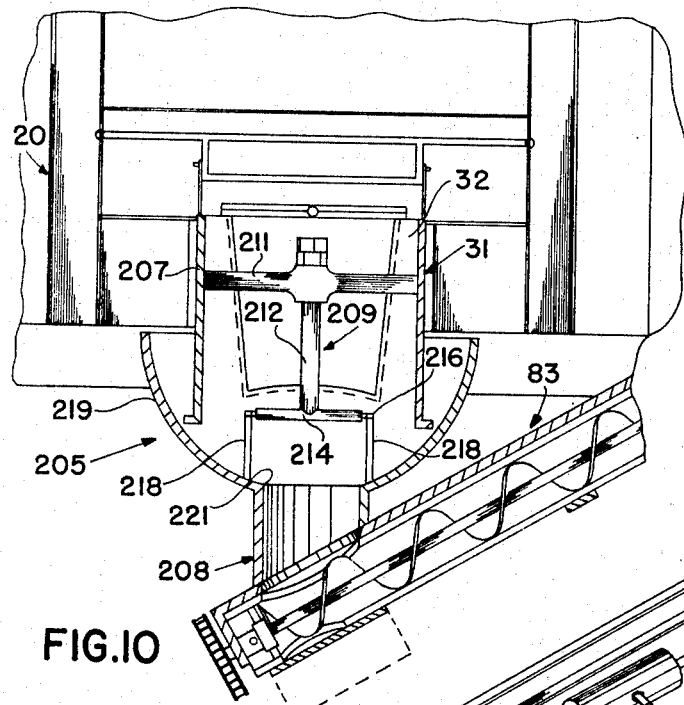
FIG. 10 is a sectional view similar to FIG. 2 illustrating a second embodiment of the unloader apparatus of this invention.

In a second embodiment of the unloader apparatus of this invention as shown in FIG. 10 and indicated generally at 205, the gathering box means 31 has the directing means 32 connected to an upright cylindrical body 207 to which is connected a conveyor means 208 by a hanger assembly 209. The hanger assembly 209 has a support shaft 211 welded to opposite sides of the body 207 and an upright post 212 rotatably connected thereto. The lower end of the post 212 is secured to a tube member 214 having a support rod 216 rotatable therein. Opposite ends of the rod 216 are secured to a pair of hanger members 218 which are secured to a valve or a ball member 219 of the conveyor means 208. The ball member 219 extends upwardly and outwardly of the body 207 to receive material therein for movement through an opening 221 and lateral conveyance by the spout means 83 as previously described. It is seen that the rotatable connection of the support rod 216 and the upright post 212 permits both horizontal and vertical rotational movement of the spout means 83 about the gathering box means 31 to position an outer discharge nozzle member (not shown) in a pre-selected desired position.

The use and operation of the unloader apparatus 205 substantially duplicates that previously described for the first embodiment of the unloader apparatus 17 except there is not frictional engagement between a ball and socket assembly to maintain material within the conveyor means 208 and to aid in holding the spout means 83 in a given adjusted position.

It is obvious that a highly efficient and economical unloader apparatus has been described herein which is readily attachable to a conventional truck bed or the like and usable to discharge granular material such as fertilizer, feed, and the like therefrom to desired positions with a minimum amount of effort and time involved. The unloader apparatus of this invention is economical to manufacture, simple to operate, easy to maintain and clean, and readily mountable and operable by a single operator.

As will be apparent from the foregoing description in the preferred embodiments of the applicant's unloader apparatus, relatively simple means have been provided which is easily attachable to truck beds or the like so as to provide a simplified and economical means of unloading a truck bed.

While the invention has been described in connection with preferred specific embodiments thereof, it is to be understood that this description is intended to illustrate and not to limit the scope of the invention, which is defined by the following claims.

I claim:

1. An unloader apparatus adapted to convey material from a reservoir such as a truck bed, comprising:
   (a) gathering box means having attachment means connectible to the reservoir adapted to receive material therefrom,
   (b) conveyor means pivotally connected to said box means to receive material therefrom, said conveyor means having a support base rotatably connected to said box means and an elongated auger means releasably connected to said support base by a plurality of spaced clamp member secured to said support base,
   (c) power means connected to said auger means operable to convey material therethrough and permit movement of said auger means in arcuate paths about said box means to convey material from the reservoir to a desired location, and
   (d) said auger means having opposed openings at one end to receive material from said box means and to clean out said auger means, respectively, and
   (e) said support base having an elongated channel member adapted to receive said auger means having said clamp members connected thereto; and
   (f) one of said clamp members positioned to selectively seal and expose said clean-out opening.

2. An unloader apparatus as described in claim 1, wherein:
   (a) said socket portion having an opening off-set relative to its vertical axis away from said auger means to direct material into said conveyor means whereby said off-set opening presents increased arcuate movement of said auger means vertically.

3. An unloader apparatus as described in claim 1, wherein:
   (a) said box means having a cylindrical body,
   (b) said conveyer means having a socket portion secured to said body with a hanger assembly,
   (c) said socket portion extended upwardly and outwardly of said body to receive material therefrom, and
   (d) said hanger assembly having a support shaft secured to said body, an upright post rotatably connected to and vertically supported by said support shaft, a sleeve connected to said post, and a support rod secured to said socket portion rotatably mounted within said sleeve to permit unrestricted swivel movement of said conveyor means relative to said box means.

4. An unloader apparatus adapted to convey material from a reservoir such as a truck bed, comprising:
   (a) gathering box means having attachment means connectible to the reservoir adapted to receive material therefrom,
   (b) conveyor means pivotally connected to said box means to receive material therefrom, said conveyor means having a support base rotatably connected to said box means and an elongated auger means releasably connected to said support base by a plurality of spaced clamp members secured to said support base,
   (c) power means connected to said auger means operable to convey material therethrough and permit movement of said auger means in arcuate paths about said box means to convey material from the reservoir to a desired location,
   (d) said box means having a spherical socket portion and a pair of gate members operable to selectively control material flow into said socket portion from the reservoir,
   (e) said support base having a ball portion mounted in nesting engagement within said socket portion for relative swivel movement therein,
   (f) means secured to said box means and engagable with said ball portion to bias said socket portion and said ball portion into frictional engagement to hold said conveyor means in any given adjusted position,
   (g) said bias means having a support iron secured to said socket portion, a shaft with opposite ends secured to said ball portion, a cap member secured to said support iron, and a sleeve assembly connected to said cap member and rotatably mounted on said shaft, and
   (h) said sleeve assembly having a spring member engageable with said cap member operable to bias said ball portion into frictional engagement with said socket portion whereby said ball portion is vertically movable on rotation of said shaft within said sleeve assembly and rotatable on movement of said sleeve assembly within said cap member.

5. An unloader apparatus as described in claim 4 wherein:

(a) said shaft extended through the center of the axis of rotation of said ball portion to assure unrestrictional rotational movement thereof in all directions.

References Cited

UNITED STATES PATENTS

| | | | |
|---|---|---|---|
| 2,107,682 | 2/1938 | Wall | 214—83.26 X |
| 2,438,301 | 3/1948 | Schulte | 214—522 |
| 2,675,932 | 4/1954 | Potter | 214—83.26 |
| 3,031,064 | 4/1962 | Kline | 198—64 X |
| 3,090,507 | 5/1963 | Gutekunst et al. | 198—64 X |
| 3,203,532 | 8/1965 | Mimnaugh et al. | 198—64 |

EVON C. BLUNK, *Primary Examiner.*

M. L. AJEMAN, *Assistant Examiner.*